United States Patent
Kersjes et al.

(10) Patent No.: US 10,405,316 B2
(45) Date of Patent: Sep. 3, 2019

(54) CONTACTLESS CONNECTOR LOCATION SYSTEMS AND METHODS

(71) Applicant: Keyssa Systems, Inc., Campbell, CA (US)

(72) Inventors: Theo Kersjes, Portland, OR (US); John Wolcott, Banks, OR (US)

(73) Assignee: KEYSSA SYSTEMS, INC., Campbell, CA (US)

( * ) Notice: Subject to any disclaimer, the term of this patent is extended or adjusted under 35 U.S.C. 154(b) by 134 days.

(21) Appl. No.: 14/886,354

(22) Filed: Oct. 19, 2015

(65) Prior Publication Data

US 2017/0111943 A1    Apr. 20, 2017

(51) Int. Cl.
| | | |
|---|---|---|
| H04W 72/04 | (2009.01) | |
| H04B 5/00 | (2006.01) | |
| H04W 4/02 | (2018.01) | |
| H04M 1/725 | (2006.01) | |
| H04W 4/80 | (2018.01) | |
| H04W 76/14 | (2018.01) | |
| H04W 76/10 | (2018.01) | |
| H04W 76/11 | (2018.01) | |
| H04W 84/18 | (2009.01) | |

(52) U.S. Cl.
CPC ........ *H04W 72/046* (2013.01); *H04B 5/0031* (2013.01); *H04M 1/7253* (2013.01); *H04W 4/023* (2013.01); *H04W 4/026* (2013.01); *H04W 4/80* (2018.02); *H04W 76/10* (2018.02); *H04W 76/11* (2018.02); *H04W 76/14* (2018.02); *H04W 84/18* (2013.01)

(58) Field of Classification Search
CPC . H04W 76/023; H04W 4/008; H04W 72/046; H04W 76/021; H04B 5/0031
See application file for complete search history.

(56) References Cited

U.S. PATENT DOCUMENTS

| | | | |
|---|---|---|---|
| 9,667,290 B2 * | 5/2017 | Ouyang | H04B 1/1081 |
| 2010/0250818 A1 * | 9/2010 | Gill | G06F 1/1632 |
| | | | 710/304 |
| 2013/0084801 A1 * | 4/2013 | Royston | G06K 7/015 |
| | | | 455/41.1 |
| 2013/0109310 A1 * | 5/2013 | Mine | G06F 3/0488 |
| | | | 455/41.1 |
| 2013/0210346 A1 * | 8/2013 | Ling | H04W 4/80 |
| | | | 455/41.1 |
| 2013/0281014 A1 | 10/2013 | Frankland et al. | |
| 2014/0183269 A1 * | 7/2014 | Glaser | G06F 21/32 |
| | | | 235/492 |

(Continued)

FOREIGN PATENT DOCUMENTS

WO    2013/080080    6/2013

*Primary Examiner* — Jeffrey M Rutkowski
*Assistant Examiner* — Basil Ma
(74) *Attorney, Agent, or Firm* — Van Court & Aldridge LLP

(57) ABSTRACT

Embodiments discussed herein refer to systems, methods, and circuits for locating obfuscated EHF contactless connectors so that a contactless communication link can be established between two devices. When connector interfaces are not readily ascertainable, a user may rely on the location embodiments discussed herein to quickly and correctly orient his or her device with respect to another device to establish the contactless communication link.

4 Claims, 7 Drawing Sheets

(56) References Cited

U.S. PATENT DOCUMENTS

2014/0273852 A1* 9/2014 McCormack ........ H04B 5/0031
　　　　　　　　　　　　　　　　　　　　　455/41.2
2016/0337496 A1* 11/2016 Jeganathan ......... H04M 1/7253
2017/0288740 A1* 10/2017 Castell ................. G06F 1/1656
2017/0317729 A1* 11/2017 Kobayashi ........... H04B 7/0617

* cited by examiner

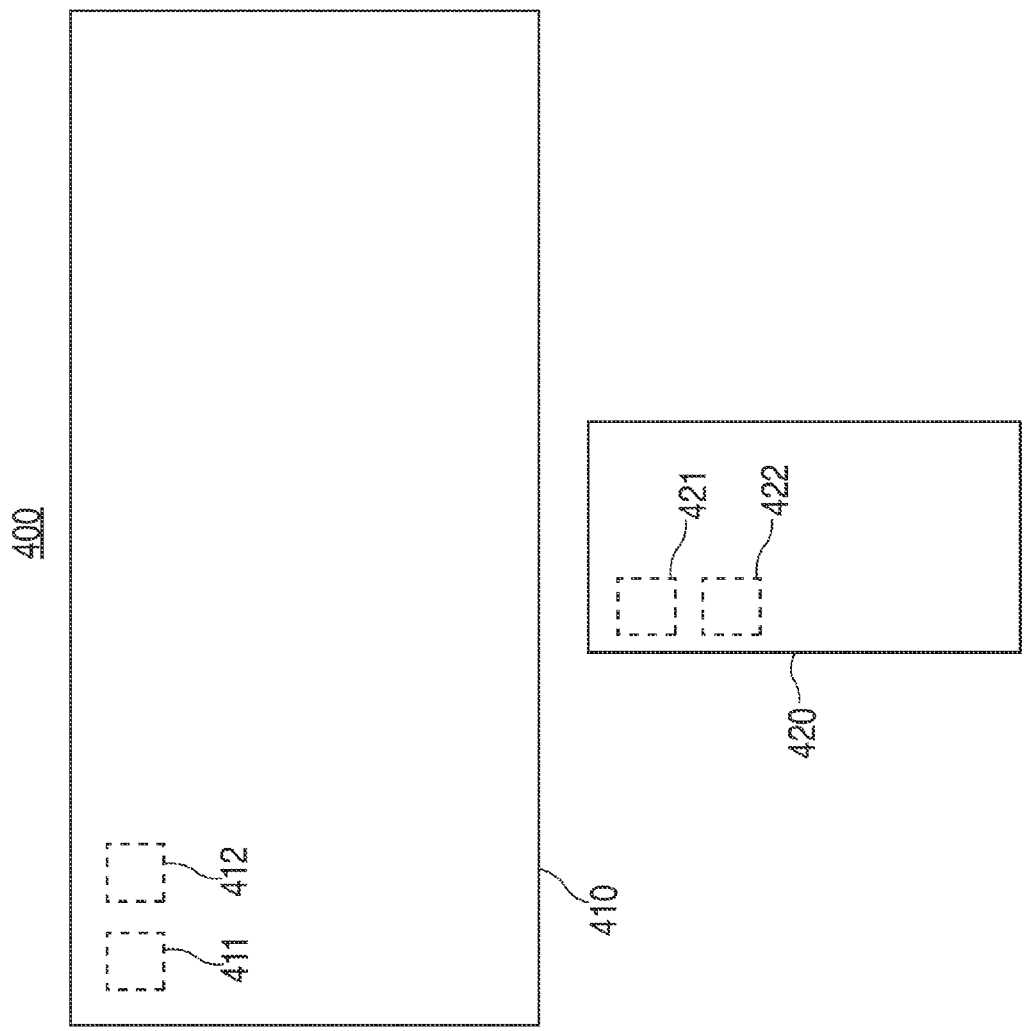

CONTACTLESS CONNECTOR LOCATION SYSTEMS AND METHODS

FIELD OF THE INVENTION

The present disclosure relates to extremely high frequency ("EHF") systems and methods for the use thereof, and more particularly to systems and methods for locating obfuscated contactless connector interfaces.

BACKGROUND

Electronic devices can be "connected" together to enable data transfer between the devices. Typically, the connection between the two devices can be a cabled connection or a wireless connection. A cabled connection such as Universal Serial Bus (USB) is typically point-to-point, and requires mechanical connectors at each device, and a cable between the devices. A wireless connection such as WiFi or Bluetooth can operate in a "broadcast" mode, where one device can communicate simultaneously with several other devices, over a radio frequency (RF) link, typically in the range of 700 MHz-5.8 GHz.

Contactless connectors represent a different type of connector, compared to conventional cabled and wireless connectors, for transferring data between devices. Contactless connectors can be used for point-to-point contactless data communication between two devices and do not require a mechanical coupling to enable data transfer. The contactless connectors of both devices merely need to be placed in close enough proximity to each other to enable contactless data transfer. Since no mechanical connection is required, the contactless connector can be seamlessly integrated into a device, and depending on industrial design choices, the location of contactless connectors can be hidden from view. Hidden or obfuscated contactless connectors can potentially make it difficult for a user to orient a device with respect to another device in order to establish a contactless communications link between the two devices. Accordingly, what are needed are systems and methods for locating obfuscated contactless connectors.

BRIEF SUMMARY

Embodiments discussed herein refer to systems, methods, and circuits for locating obfuscated EHF contactless connectors so that a contactless communication link can be established between two devices. When connector interfaces are not readily ascertainable, a user may rely on the location embodiments discussed herein to quickly and correctly orient his or her device with respect to another device to establish the contactless communication link.

In one embodiment, a method for locating obfuscated contactless communication transceiver units (OCCTUs) associated with a first device is provided. The method can be implemented in a second device including at least one contactless communication transceiver unit (CCTU) that contactlessly communicates with a reciprocal one of the OCCTUs. The method can include monitoring for a beaconing signal being emitted by at least one OCCTU. In response to detecting the beaconing signal, the method can include instructing a user to move the second device with respect to the first device so that the first device can ascertain an RF field boundary of the at least one OCCTU. After ascertaining the RF field boundary, the method can include providing alignment instructions for the user to position the second device with respect to the first device such that at least one CCTU associated with the second device is optimally aligned with a reciprocal OCCTU.

In another embodiment, a first device for use in locating and aligning to obfuscated contactless communication transceiver units associated with a second device is provided. The first device can include at least one contactless communication transceiver unit (CCTU), an I/O component operative to provide information to a user, and connector alignment circuitry coupled to the at least one CCTU and the I/O component. The connector alignment circuitry can be operative to monitor for existence of an RF field being emitted by the OCCTU, and in response to monitoring existence of the RF field, provide alignment instructions to the user via the I/O component to guide the user in positioning the first device with respect to the second device such that the at least one CCTU is aligned with a reciprocal OCCTU.

In yet another embodiment, a base device operative to contactlessly communicate with a user device is provided. The base device can include a housing characterized as having a major surface and a minor surface, and at least one obfuscated contactless communication transceiver unit disposed along one of the major surface and the minor surface. The at least one OCCTU can be operative to emit a beaconing signal that alerts presence of a RF field to the user device and that includes identifying information specifying whether the base device has its at least one OCCTU disposed along its major surface or minor surface, and establish a contactless link with a contactless communication unit (CCU) associated with the user device when the user device is positioned in a connector alignment position with respect to the base device.

A further understanding of the nature and advantages of the embodiments discussed herein may be realized by reference to the remaining portions of the specification and the drawings.

BRIEF DESCRIPTION OF THE DRAWINGS

FIG. 4 shows illustrative devices containing obfuscated contactless communication units, according to an embodiment;

DETAILED DESCRIPTION

Figure 1:
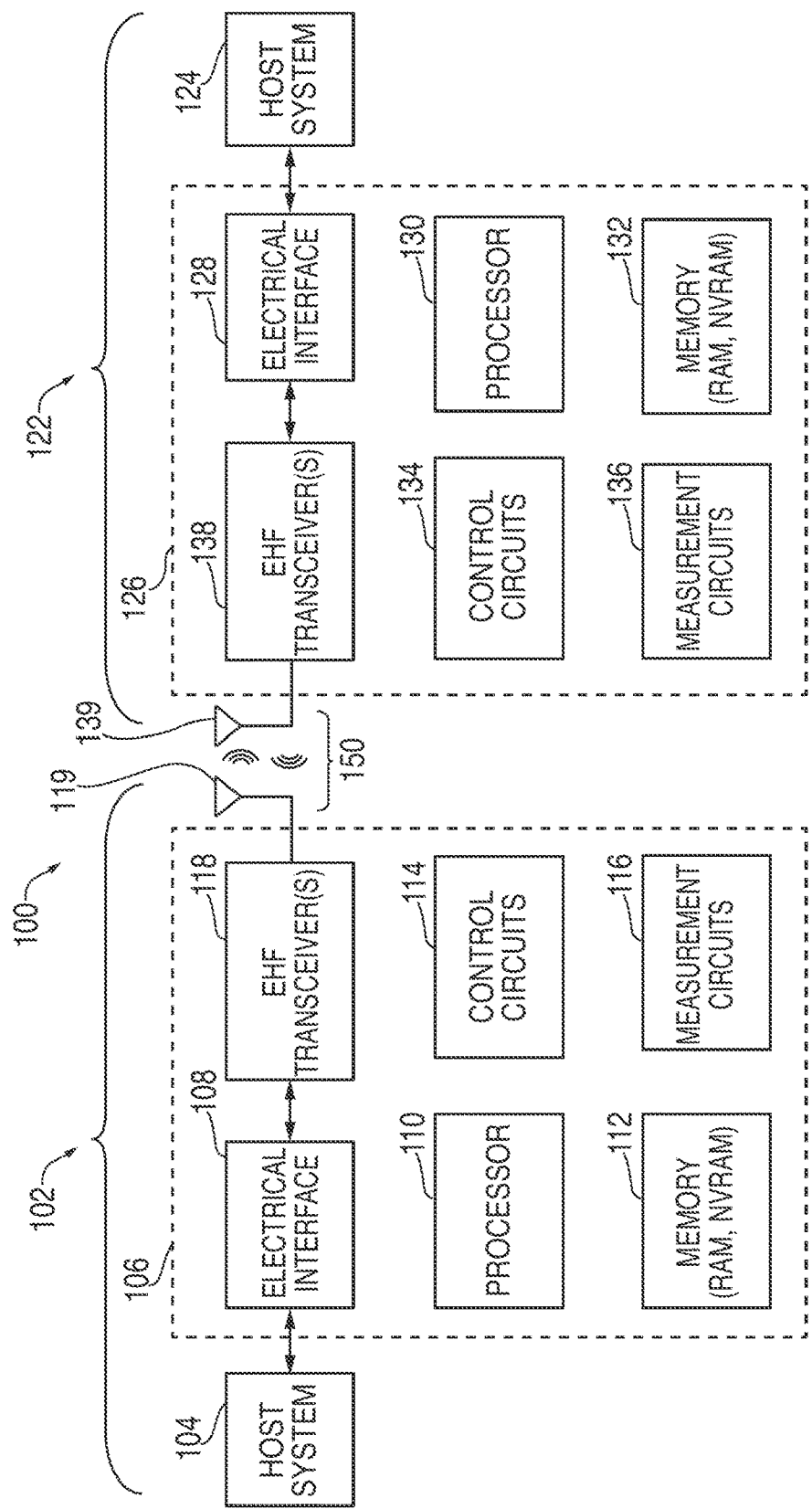
FIG. 1 illustrates a communications system, according to an embodiment.

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC packages. Comm-link chips are an example of a communication device, also referred to as contactless communication unit, a contactless communications transceiver unit (CCTU or EHF XCVR).

The term "transceiver" may refer to a device such as an integrated circuit ("IC") including a transmitter (Tx) and a receiver (Rx) so that the integrated circuit may be used to both transmit and receive information, such as data. Such a transceiver may be referred to herein as a CCU or an EHF XCVR. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to the implementing electromagnetic (EM) rather than electrical (wired, contact-based) connections and transport of signals between entities (such as devices). As used herein, the term "contactless" may refer to a carrier-assisted, dielectric coupling system. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF XCVRs described herein may be designed to adhere to various requirements mandated by one or more governments or their agencies. For example, the FCC may promulgate requirements for certification for transmitting data in a RF frequency band.

"Standards" and related terms such as "Standards-based", "Standards-based interfaces", "Standards-based protocol", "interface protocols," and the like may refer to legacy interface standards which may include but are not limited to USB (e.g., USB 2, USB 3, USB 3/2, or USB OTG), DisplayPort (DP), Thunderbolt, HDMI, SATA/SAS, PCIe, Ethernet SGMII, Hypertransport, Quickpath, I2S, GPIO, I2C and their extensions or revisions. For example, the term "interface protocol" may refer to the protocol being used by one system to communicate with another system. As a specific example, the interface protocol being used by a system may be a USB interface protocol; as such, the system may communicate according to the rules governing USB communications.

When transferring data between EHF communication units, the transfer speed and quality are optimal when an Rx is placed in the signal path where the Tx radiates maximum signal strength. Thus, higher data transfer efficiency is realized when the Rx and Tx are properly aligned with respect to each other. However, in some embodiments, the Rx and Tx are embedded in devices, and users may not readily ascertain how to align the Rx and Tx communication units, thereby making it difficult for users to place EHF communication units in positions where signal strength and data transfer speeds are optimized. While mechanical and/or magnetic structures may assist in alignment, they take up real estate, limit design options and take away from more elegant device designs.

Mechanical structures have been traditionally used to assist users in aligning paired communication units. For example, a first device may have a cradle designed to interface with a second device such that when the second device is placed in the cradle, the paired communication units are aligned. Alternatively, other traditional structures for properly aligning communication units can include stubs, docks, magnets, keying features, or any other physical structures may assist users in determining where to place devices so that EHF communication units are properly aligned. However, having a physical cradle or other physical feature may limit device design options and respective devices that may be paired. In addition, such physical structures may use valuable real estate, limit design options, and affect industrial design.

Another alternative to mechanical structures for facilitating proper alignment can include indicia, such as, for example, brackets, arrows, boxes, lines, etc. that serve as visual cues for guiding users obtaining proper alignment of EHF communication units. However, similar to the undesirable attributes of mechanical structures, the indicia may be unsightly, nondurable, and compromising to industrial design.

Embodiments discussed herein use intentionally obfuscated contactless connectors to maintain device elegance and minimize design limitations, yet still provide connector interfacing guidance to ensure secure and efficient contactless communications links are established between two devices. An obfuscated contactless connector, as defined herein, refers to a CCU that is incorporated within a device with little or no indication of where it is located and/or that provides no alignment or registration mechanism for interfacing with another device so that both devices are positioned in the correct position to establish a contactless communications link. In some embodiments, there may also be no indicia or physical markers indicating the location of the CCU. In other embodiments, there may be a marker that indicates the general vicinity of where the CCU is located in the device, but there may not be any alignment or registration elements that guide the relative position of another device to the location needed to establish a contactless communications link. The obfuscated nature of the contactless connector may make the location of such connectors difficult or impossible to see without assistance from connector alignment circuitry and methods according to various embodiments described herein.

Connector alignment circuits and methods can include haptic feedback pointers, temporary visual clues such as graphical user interfaces (GUIs) and lights, audio clues, or any combination thereof to provide "temporary" alignment guidance. The alignment guidance provided by the connector location embodiments may be temporary in that they may only be used/presented while the user is attempting to establish a connection, and is not omnipresent in the same manner a mechanical registration would be. Prior to connection attempts or after the connection has been made, the existence of alignment guidance elements are not readily apparent to the user and therefore do not take up additional real estate on devices or place limitations on industrial designs.

The alignment guidance instructions may be used in conjunction with a signal strength detection mechanism that can determine where a first device is relative to a second device by evaluating the strength of a RF field emitted by one or more CCUs, and based on that determination, the alignment guidance element can instruct a user to position his device in the correct location and orientation to establish a contactless communications link. The alignment guidance elements may be used in devices having just one CCU, multiple CCUs, a single pair of CCUs, multiple pairs of CCUs or an array of CCUs.

FIG. 1 illustrates a communications system 100, wherein two electronic device subsystems or devices 102 and 122 may communicate with one another over at least one contactless communications link 150. Data may be transferred in at least one direction, from first device 102, which may be regarded as a "source" for sending the data to be transferred, to second device 122, which may be regarded as a "destination" for receiving the data to be transferred. With reference to FIG. 1, the transfer of data from first device 102 to second device 122 may be described. However, it should be understood that data may alternatively or additionally be transferred from second device 122 (e.g., acting as a "source" for sending the data) to first device 102 (e.g., acting as a "destination" for receiving the data), and that information may also be exchanged in both directions between devices 102 and 122 during a given communications session.

For illustrative clarity, devices 102 and 122 will be described as "mirror images" of one another, but it should be understood that the two devices 102 and 122 may be different than each other. For example, one of the devices may be a laptop computer or surface computer and the other device may be a mobile telephone or other portable device. Some examples of electronic devices which may benefit from the techniques disclosed herein may include cellular telephones (or handsets, or smart phones), computers, docks (e.g., docking stations), laptops, tablets, or comparable electronic devices, to name but a few.

First electronic device 102 may include a host system 104 and a contactless communication unit 106, which may be referred to as an "EHF contactless communication unit", a "smart" contactless connector, a "communication subsystem", a "smart connector", a "contactless connector", or simply a "connector" 106. The unit 106 associated with first device 102 may be generally capable of performing at least one of establishing and managing operation of contactless link 150 with unit 126 of second device 122, monitoring and modifying data passing through unit 106 onto link 150, and/or interfacing with and providing application support for host system 104. These functions of unit 106, with regard to interacting with link 150, the data, and host system 104, may be described and elaborated upon and discussed in greater detail in this disclosure.

Unit 106 associated with first device 102 may include some or all of the following elements: electrical interface 108, processor 110 and associated memory 112, control circuits 114, measurement circuits 116, one or more transceivers 118, and/or one or more transducers 119. The operation of these various elements (108-119) may be described and elaborated upon and discussed in greater detail in this disclosure.

Second electronic device 122 may include host system 124 and a contactless communication unit 126, which may be referred to as an "EHF contactless communication unit", a "smart" contactless connector, a "communication subsystem", a "smart connector", a "contactless connector", or simply a "connector" 126. Connector 126 associated with second device 122 may be generally capable of establishing and managing operation of contactless link 150 with unit 106 of first device 102, monitoring and modifying data passing though the unit 126 onto link 150, and/or interfacing with and/or providing application support for host system 124. These functions of unit 126, with regard to interacting with link 150, the data, and the host system 124, may be described and elaborated upon and discussed in greater detail in this disclosure.

Unit 126 associated with second device 122 may include some or all of the following elements: an electrical interface 128, processor 130 and associated memory 132, control circuits 134, measurement circuits 136, one or more transceivers 138, and/or one or more transducers 139. The operation of these various elements (128-139) may be described and elaborated upon and discussed in greater detail in this disclosure.

Units 106 and 126 may operate without intervention from host processors (e.g., processors of host systems 104 and 124, respectively), and/or may take control of the host systems 104 and 124, respectively, or portions thereof. Units 106 and 126 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (e.g., in FIG. 1) around units 106 and 126 may simply represent "partitioning" of functions, separating (e.g., distinguishing) units 106 and 126 from host system 104 and 124, respectively. The antennae shown (e.g., symbolically as transducers 119 and 139) outside of the dashed-line rectangles may be considered to be within the functional blocks of units 106 and 126, but may be disposed either internal or external to a communications chip constituting the contactless connector (e.g., for receiving EHF contactless signals from another antennae/transducer (e.g., across link 150)). The dashed-line rectangles shown (e.g., in FIG. 1) around units 106 and 126 may also represent non-conducting barriers (e.g., housings, enclosures, or the like, not shown), such as plastic or acrylic enclosures for units 106 and 126 or could also include entire devices 102 and 122, respectively, as described hereinabove.

Electrical interfaces 108 and 128 may include communications port(s)/channel(s) to communicate with any suitable portion(s) of host systems 104 and 124, respectively. Host systems 104 and 124 may have their own processors and associated circuitry (e.g., as described below with respect to FIG. 2 but not shown in FIG. 1). As mentioned, devices 102 and 122 may be described as "mirror images" of one another, but it should be understood that the two devices 102 and 122, and/or the two host systems 104 and 124, may be different than each other. For example, one of the devices or host systems may be a laptop computer, the other device or host system may be a mobile telephone or an adapter for a mobile telephone. Some examples of electronic devices which may benefit from the techniques disclosed herein may include cellular telephones (or handsets, or smart phones), computers, docks (e.g., docking stations), laptops, tablets, or comparable electronic devices, to name but a few.

Processors 110 and 130 may be embedded microprocessors, or microcontrollers, or state machines, may run management operating systems (OSs) for the connection, and/or may have built-in authentication/encryption engines. Processors 110 and 130, either alone or in combination with other elements presented herein, may be operative to manage the communications link, to monitor data passing through the units and over the communications link, and/or to provide application support for a host system, or to execute one or more state machines, or variations thereof as may become evident from the several functional descriptions set forth herein. In a broader sense, units 106 and 126 may be capable of performing one of more of (at least one of) the various functions described herein.

Memory 112 and 132 may be any suitable memory, such as random access memory (RAM), non-volatile RAM (NVRAM, such as flash memory), or the like, and may include registers containing configuration, status, permissions, content permissions, keys for authentication/encryption, application(s) (e.g., software and/or firmware for use by processor 110 and 130), and the like.

Control circuits 114 and 134 may include any suitable circuitry that may be capable of monitoring the state of the link and/or actively appending to or changing data concurrently ("on-the-fly") as it goes through unit 106 or 126, respectively.

Measurement circuits 116 and 136 may include any suitable circuitry that may be capable of observing (e.g., monitoring) the connection state/status, the connection type, and/or the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas 119 and 139) that may be suitable for converting between electrical signals (e.g., for the host system) and EM signals (e.g., for the contactless communications link). Transceivers 118 and 138 may each be a half-duplex transceiver that can asynchronously convert a baseband signal into a modulated EHF carrier, which may be radiated from an internal or external antenna (e.g., as shown schematically), or can receive and demodulate the carrier and reproduce the original baseband signal. The EHF carrier may penetrate a wide variety of commonly-used non-conductive materials (e.g., glass, plastic, etc.).

It should be understood that if only one-way communication is required, such as from first device 102 to second device 122, transceiver 118 could be replaced by a Tx and transceiver 138 could be replaced by a Rx.

Transmit power and receive sensitivity for transceivers 118 and 138 may be controlled to minimize electromagnetic interference (EMI) effects and/or to simplify FCC certification, if appropriate.

Transceivers 118 and 138 may be implemented as IC chips comprising a Tx, a Rx, and related components. Transceiver chip(s) may be packaged in a conventional manner, such as in ball grid array (BGA) format. The antenna may be integrated into the package, or may be external to the package, or may be incorporated onto the chip itself. An exemplary unit 106, 126 may include one, two, or more transceiver chips. Some features or characteristics of transceivers 118 and 138 may include low latency signal path, multi-gigabit data rates, link detection, and/or link training. The signals transmitted by transceivers 118 and 138 may be modulated in any suitable manner to convey the data being transferred from one device to the other device, some non-limiting examples of which are presented herein. Modulation may be OOK (on/off keying), ASK, PSK, QPSK, QAM, or other suitable modulation techniques. Signals may be encoded and packetized and transmitted by one transceiver (e.g., transceiver 118), and received and unpacketized and decoded by another transceiver (e.g., transceiver 138). Out-of-band signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (e.g., fingerprinted), which may enable a later forensic analysis to be performed for digital rights management. For example, protected (e.g., premium) content could be freely (e.g., unimpededly) transferred from one device to another, but the transaction could be traced to the specific devices involved, so that the participants in the transaction can be held accountable (e.g., billed). Premium protected content may be modified, data appended thereto, and/or can be logged with chip ID, user ID, or by other means.

Communications link 150 may be a "contactless" link, and the first and second units 106 and 126 may be "contactless" connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Standards controllers, including Ethernet, may not be immediately apparent in that both may handle data flow between a host system and a communications link. However, a distinction between the contactless connectors disclosed herein and exemplary Standards controllers may be that the contactless connectors disclosed herein may both set up the contactless communications link and transfer data from a host system directly onto the contactless communications link, without the intermediary, for example, of mechanical (e.g., electrical, not RF) connectors and a cable. Further distinctions may be made in the way that the contactless connectors disclosed herein may be capable of operating independently and/or transparently from the host system, without requiring host awareness or interaction.

Data transfer between electronic devices 102 and 122 may be implemented over a "contactless" RF EM communications link 150, which may be handled substantially entirely by the units 106 and 126 of first and second devices 102 and 122, respectively. Signals flowing between units 106 and 126 of devices 102 and 122 may occur electromagnetically over a non-electrical (e.g., dielectric) medium, such as an air gap, waveguide, plastics (e.g., polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides. Alternatively, the signals may pass by way of a slot antenna in a conductive medium, where the slot antenna may direct the contactless connectivity in a desired direction. A device (e.g., at least the contactless connector) may be substantially fully enclosed by a conductive medium other than at a location where it may be desired to emit and/or receive EHF radiation from a partner device (e.g., at least the contactless connector thereof), which may also be similarly substantially fully enclosed by a conductive medium.

Due to the high data rate enabled by the EHF contactless communication, large data files, such as movies, audio, device images, operating systems, and the like may be transferred in very short periods of time in contrast with existing technologies such as NFC. As an example, a 1 Gigabyte data file may be transferred in as little as 2 seconds. The electromagnetic communication may typically be over an air gap that may be limited to a short range, such as 0-5 cm. A dielectric medium, such as a dielectric coupler, may be used to extend the range of the contactless link between the devices 102 and 122 to several centimeters, meters, or more.

It should be understood that in this, and any other embodiments of contactless links discussed herein, an overall communications system may be implemented as a combination of contactless and physical links. Furthermore, some of the techniques described herein may be applied to transferring data over a physical link. In such a link the transceiver can contactlessly transmit data to a cable that may serve as a physical conduit for the data.

One or both of devices 102 and 122 may have two or more transceivers. Having two or more transceivers may support a feedback loop, latency, changes, full duplex operation, and/or may simultaneously establish a second communications link (e.g., for communicating with the host system). An exemplary "data flow" may proceed as follows: data originating from host system 104 or data originating at unit 106 may be provided by unit 106, via its transceiver 118 and transducer 119, onto the communications link 150. The data may pass through or over communications link 150. Data received from the communications link 150 by transducer 139 and transceiver 138 of unit 126 may be provided to host system 124 or may remain with unit 126. Data may flow in the reverse direction, from host system 124 via unit 126 or originating at unit 126 onto the contactless link 150 to unit 106 which may pass the data to host system 104. Although not shown, each one of units 106 and 126 may include one or more suitable busses for communicating data and/or power between various components 108-119 and/or between various components 128-139.

Figure 2:
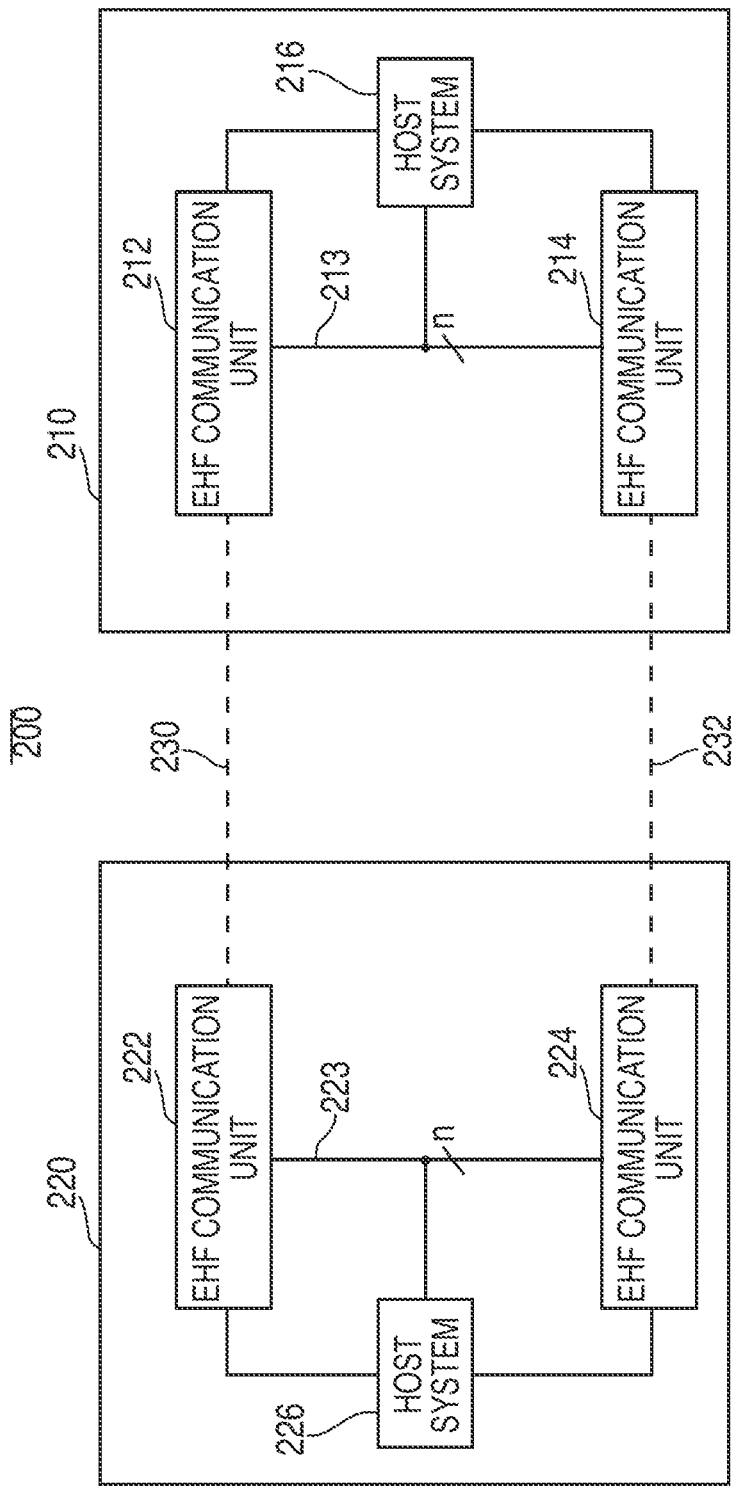
FIG. 2 illustrates a communications system having two electronic devices that communicate with one another over two or more contactless communications links, according to an embodiment.

FIG. 2 illustrates a communications system 200 wherein two electronic device subsystems or devices 210 and 220 may communicate with one another over two or more contactless communications links, according to an embodiment. System 200 may be similar to system 100 in many respects, but for illustrative and simplified discussion purposes, shows that each device may include two EHF communication units. Moreover, any EHF communication unit in system 200 may be the same or substantially the same as any EHF communication unit in system 100. As such, a more simplified representation of units 106 and 126 are shown in FIG. 2. If desired, each device can include several EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective subsystems or devices and may thereby enable subsystems or devices 210 and 220 to operate for their intended functionality.

In some embodiments, each of EHF communication units 212, 214, 222, and 224 can be the same as EHF communication unit 106 or 126, discussed above. As such, EHF communication units 212, 214, 222, and 224 may include transceivers that may be capable of being configured to transmit and/or receive EHF signals. For example, in one approach, units 212 and 224 can be configured to receive EHF signals and units 214 and 222 can be configured to transmit EHF signals. Thus, in this approach, a contactless communications link 230 may exist between EHF communication units 222 and 212, and a contactless communications link 232 may exist between EHF communication units 214 and 224. As shown, units 212 and 222 may work together as a coupled pair of units that may communicate via link 230, and units 214 and 224 may work together as another coupled pair of units that may communicate via link 232. If one or more additional coupled pairs of units were to be included in system 200, then additional communications links would also exist.

After the units progress through their respective state machines and establish the links, and data no longer needs to be communicated across the links, the units can enter in a power savings state or data transport idle state depending on whether they are being implemented as a Tx or Rx unit. The power savings state may enable an EHF communication unit to power down selective circuitry, after the EHF communication link has been established, when there may be no data to be communicated over the link. The Tx unit may transmit a "keep alive" signal to the Rx unit to prevent it from timing out and exiting out of its power savings state. The Rx unit may be periodically turned on to monitor whether the Tx is sending the "keep alive" signal. The Tx and Rx units may transition to a new state (e.g., a data transport state) when they receive instructions to do so. As a specific example, an apparatus can include an EHF transceiver and control circuitry. The control circuitry may be operative to control establishment of an Elf communications link with another apparatus by executing a state machine that may transition from state to state in response to satisfaction of any one of a plurality of conditions, establish the EHF communication link with the apparatus to selectively enable one of transmission and reception of data, after the EHF communication link with the apparatus may be established, monitor an absence of data being communicated over the EHF communication link, and enter into a power savings state in response to the monitored absence of data being communicated over the EHF communication link until the state machine transitions to a new state.

Both devices 210 and 220 have the ability to control activation and deactivation of the links existing between the two devices. For example, if the links are in a power savings mode, and device 210 decides it wishes to transmit data to device 220, device 210 may change a signal state on one of the pins of one of its EHF units to bring it out of sleep and into an active data transport ready state. In response to the change in signal state, it may transmit a signal over the contactless communications link to its counterpart EHF unit, which may exit out of its power state and enter into an active data transport state. In addition, the counterpart EHF unit may inform other circuitry within device 220 that incoming data traffic is about to commence and that any appropriate changes are put into effect so that the data can be handled properly. For example, in the context of various embodiments described herein, when the counterpart EHF unit is contained in an adapter device that is electrically coupled to a user device, the counterpart EHF unit may provide a signal that causes adapter circuitry to turn off an active connection coupling a memory to the user device and activate a connection coupling the memory to the EHF unit.

Figure 3:
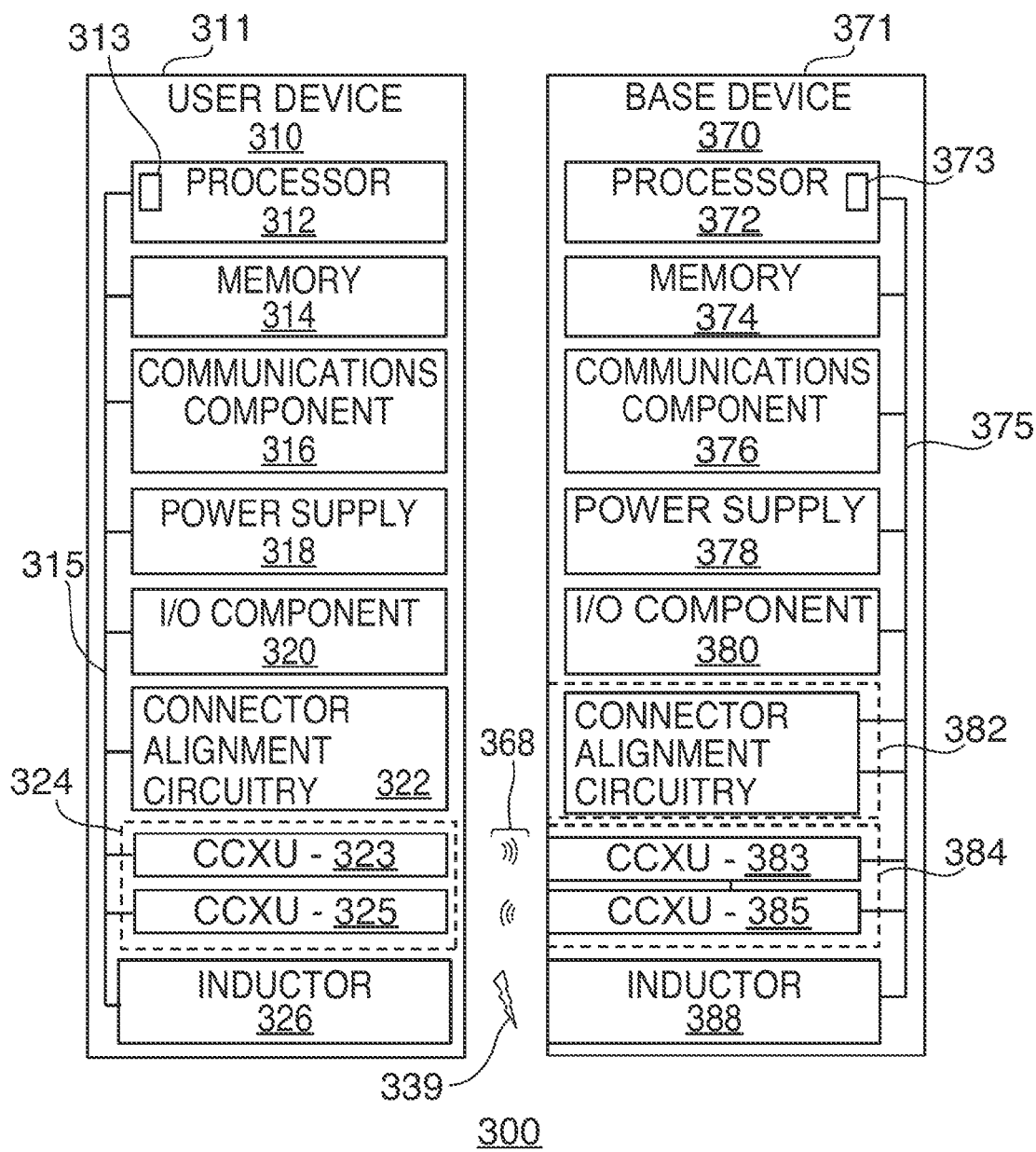
FIG. 3 shows a communications system, according to an embodiment.

As shown in FIG. 3, for example, a communications system 300 may include a first electronic device subsystem or first electronic device or user device 310, and a second electronic device subsystem or second electronic device or base device 370.

User device 310 may be any suitable device or subsystem that may include one or more of a processor 312, memory 314, a communications component 316, a power supply 318, an input component and/or an output component (I/O component) 320, connector alignment circuitry 322, a user device connector 324, and/or inductor 326. User device 310 may also include a bus 315 that may provide one or more wired or wireless communication links or paths for transferring data and/or power to, from, or between various other components of device 310. User device 310 may also be provided with a housing 311 that may at least partially enclose one or more of the components of device 310 for protection from debris and other degrading forces external to device 310. In some embodiments, one or more components of user device 310 may be combined or omitted. Moreover, user device 310 may include other components not combined or included in FIG. 3. For example, user device 310 may include any other suitable components or several instances of the components shown in FIG. 3. For the sake of simplicity, only one of each of the components of user device 310 is shown in FIG. 3.

Memory 314 may include one or more storage mediums, including for example, a hard-drive, flash memory, permanent memory such as read-only memory (ROM), semi-permanent memory such as RAM, any other suitable type of storage component, or any combination thereof. Memory 314 may include cache memory, which may be one or more different types of memory used for temporarily storing data for electronic device applications. Memory 314 may be fixedly embedded within device 310 or may be incorporated on one or more suitable types of cards that may be repeatedly inserted into and removed from user device 310 (e.g., a subscriber identity module (SIM) card or secure digital (SD) memory card).

Power supply 318 can include any suitable circuitry for receiving and/or generating power, and for providing such power to one or more of the other components of user device 310. For example, power supply 318 can be coupled to a power grid (e.g., when device 310 is not acting as a portable device or when a battery of the device is being charged at an electrical outlet with power generated by an electrical power plant). As another example, power supply 318 can be configured to generate power from a natural source (e.g., solar power using solar cells). As another example, power supply 318 can include one or more batteries for providing power (e.g., when device 310 is acting as a portable device).

One or more input components of I/O component 320 may be provided to permit a user to interact or interface with user device 310. For example, such an input component of user device 310 can take a variety of forms, including, but not limited to, a touch pad, touch screen, one or more buttons (e.g., a keyboard), mouse, microphone, camera, scanner, proximity sensor, light detector, motion sensor, biometric sensor, and combinations thereof. Each input component can be configured to provide one or more dedicated control functions for making selections or issuing commands associated with operating user device 310. One or more output components of I/O component 320 may be provided to present information (e.g., graphical, audible, olfactory, and/or tactile information) to a user of user device 310. For example, such an output component of user device 310 may take various forms, including, but not limited to, audio speakers, visual displays (e.g., graphics displayed on a screen or a lights that are independently controlled), haptic output components, or combinations thereof. It should be noted that one or more input components and one or more output components may sometimes be referred to collectively herein as a single I/O component or I/O interface, such as a touch screen, that may receive input information through a user's touch of a display screen and that may also provide visual information to a user via that same display screen. As described below in more detail, such user interface capabilities (e.g., in accordance with any suitable application 313/373 (e.g., a connector alignment application) available for user device 310) may enable a user to interact with user device 310 in any suitable way for at least partially guiding a user to position user device 310 in a particular orientation and location with base device 370 so that a contactless communications link can be established between devices 310 and 370.

Processor 312 of user device 310 may include any processing circuitry that may be operative to control the operations and performance of one or more components of user device 310. For example, processor 312 may receive input signals from an input component of I/O component 320 and/or from any other suitable component of user device 310 (e.g., user device connector 322), and/or may drive output signals through an output component of I/O component 320 and/or through any other suitable component of user device 310 (e.g., user device connector 322). As shown in FIG. 3, processor 312 may be used to run one or more applications, such as a user device application 313. As one example, application 313 may be an operating system application and/or a third party application or other specific application (e.g., an application that coordinates operation of I/O component 320 and connector alignment circuitry 322 to guide the user to properly orient device 310 with device 370). For example, processor 312 may load application 313 as a user alignment guidance program to assist the user in positioning device 310 with respect to device 370. Application 313 may be accessed by processor 312 from any suitable source, such as from memory 314 (e.g., via bus 315) or from another device (e.g., base device 370) or a remote server. For example, an application 313 may be a computer-program product that may be stored in a tangible computer-readable memory, such as any suitable non-transitory storage drive or any other suitable computer-readable medium accessible to user device 310. Memory 314 may be an example of tangible computer-readable media that may be configured to store data such as computer-program product embodiments, including executable computer code, human-readable code, or the like. As mentioned, memory 314 may include any suitable memory, such as a floppy disk, removable hard disk, optical storage media, CD-ROM, DVD, bar code, semiconductor memories such as flash memory, ROM, RAM, battery-backed volatile memory, networked storage device, and the like. Memory 314 may store and/or processor 312 may access any suitable programming and data constructs that may provide at least a portion of the functionality of various embodiments of this disclosure. Processor 312 may include a single processor or multiple processors. For example, processor 312 may include at least one "general purpose" microprocessor, a combination of general and special purpose microprocessors, instruction set processors, graphics processors, video processors, and/or related chips sets, and/or special purpose microprocessors. Processor 312 also may include on board memory for caching purposes.

Communications component 316 may be provided to allow user device 310 to communicate with one or more other devices or servers or subsystems using any suitable communications protocol. For example, communications component 316 may support Wi-Fi (e.g., an 802.11 protocol), ZigBee (e.g., an 802.15.4 protocol), WiDi™, Ethernet, Bluetooth™, Bluetooth™ Low Energy (BLE), high frequency systems (e.g., 900 MHz, 2.4 GHz, and 5.6 GHz communication systems), infrared, transmission control protocol/internet protocol (TCP/IP) (e.g., any of the protocols used in each of the TCP/IP layers), Stream Control Transmission Protocol (SCTP), Dynamic Host Configuration Protocol (DHCP), hypertext transfer protocol (HTTP), BitTorrent™, file transfer protocol (FTP), real-time transport protocol (RTP), real-time streaming protocol (RTSP), real-time control protocol (RTCP), Remote Audio Output Protocol (RAOP), Real Data Transport Protocol™ (RDTP), User Datagram Protocol (UDP), secure shell protocol ("SSH"), wireless distribution system (WDS) bridging, any communications protocol that may be used by wireless and cellular telephones and personal e-mail devices (e.g., Global System for Mobile Communications (GSM), GSM plus Enhanced Data rates for GSM Evolution (EDGE), Code Division Multiple Access (CDMA), Orthogonal Frequency-Division Multiple Access ("OFDMA"), high speed packet access (HSPA), multi-band, etc.), any communications protocol that may be used by a low power Wireless Personal Area Network (6LoWPAN) module, USB (e.g., USB 2.0, USB 3.0, USB 3.1, USB Type C, USB 3/2, or USB OTG, with SuperSpeed or SuperSpeed+ transfer modes), DP, Apple Thunderbolt or Lightning, HDMI, SATA/SAS, PCIe, Ethernet SGMII, Hypertransport, Quickpath, I2S, GPIO, I2C, any extensions or revisions thereof, any other communications protocol, or any combination thereof. Communications component 316 may also include or be electrically coupled (e.g., via bus 315) to any suitable user device connector (e.g., any suitable wireless antenna or contactless connector or mechanical connector and/or electro-mechanical connector) that can enable user device 310 to be communicatively coupled to another device for transferring data with that other device wirelessly or via a wired connection according to a communication protocol of communications component 316. Communications component 316 may be any suitable hardware, software, firmware, or combination thereof that may enable user device 310 to communicate data via user device connector 324 to another device using a particular communications protocol.

User device 310 may also be provided with a housing 311 that may at least partially enclose one or more of the components of device 310 for protection from debris and other degrading forces external to device 310. In some embodiments, one or more of the components may be provided within its own housing (e.g., an input component of I/O component 320 may be an independent keyboard or mouse within its own housing that may wirelessly or through a wire communicate with processor 312, which may be provided within its own housing). Housing 311 may completely cover and render user device connector 324 invisible to the naked eye, thereby obfuscating user device connector 324.

User device connector 324 may include CCXU 323 and CCXU 325, both of which are contactless connectors that contactlessly communicate with reciprocal CCXUs (e.g., CCXUs 383 and 385 of device 370). Inductor 326 may be able to receive power from another source (e.g., a remote source or device 370) and provide that power to power supply 318.

Connector alignment circuitry 322 may be circuitry designed to process data received from various components of device 310 (e.g., processor 312, CCXUs 323 and 325, accelerometer, gyroscope, etc.) and generate alignment instructions that assist the user in correctly positioning device 310 with respect to device 370. The alignment instructions can be provided to I/O component 320 for presentation to the user. Additional details of the operation of connector alignment circuitry 322 are discussed in more detail below.

Base device 370 may be any suitable electronic device subsystem or electronic device that may include one or more of a processor 372 with access to a base device application 373, memory 374, a communications component 376, a power supply 378, an input component and/or an output component (I/O component) 380, connector alignment circuitry 382, and a base device connector 384. Base device 370 may also include a bus 375 that may provide one or more wired or wireless communication links or paths for transferring data and/or power to, from, or between various other components of device 370. Power supply 378 may include or be coupled (e.g., via bus 375) to an inductor 388. Base device 370 may also be provided with a housing 371 that may at least partially enclose one or more of the components of device 370 for protection from debris and other degrading forces external to device 370. In some embodiments, one or more components of base device 370 may be combined or omitted. Moreover, base device 370 may include other components not combined or included in FIG. 3. For example, base device 370 may include any other suitable components or several instances of the components shown in FIG. 3. For the sake of simplicity, only one of each of the components of base device 370 is shown in FIG. 3. Unless otherwise noted, each one of housing 371, processor 372, application 373, memory 374, bus 375, communications component 376, power supply 378, I/O component 380, connector alignment circuitry 382, and connector 384 of base device 870 may be the same as or substantially similar to a respective one of housing 311, processor 312, application 313, memory 314, bus 315, communications component 316, power supply 318, I/O component 320, connector alignment circuitry 322, and connector 324 of user device 810, and, therefore, may not be independently described in greater detail.

When devices 310 and 370 are aligned with respect to each other, connectors 324 and 384 may contactlessly communicate with each other via contactless communications link 368. Depending on the construction of devices 310 and 370, one or both connectors 324 and 384 can be obfuscated. As such, one or both of devices 310 and 370 may provide alignment guidance instructions to the user so that he or she can quickly and accurately align his or her device to the other.

FIG. 4 shows illustrative system 400 including first device 410 and second device 420 according to an embodiment. First device 410 may include obfuscated CCUs 411 and 412 arranged in a particular configuration and disposed adjacent to a surface of device 410. Second device 420 may include CCUs 421 and 422 arranged in a particular configuration. In order for a contactless link to be established between first and second devices 410 and 420, the CCUs of each device need to be positioned in close proximity of each other and in the correct orientation with respect to each other. For example, CCU 421 should be placed above CCU 411 and CCU 422 should be placed above CCU 412 in order to establish a contactless link.

Although first device 410 only shows one pair of CCUs, it should be understood that multiple pairs of CCUs or any other number of CCUs can be included in first device 410. For example, a pair of CCUs can be placed near each corner of first device 410. As another example, a single row array of CCUs may span a substantial portion of the length of first device 410. As a specific example, a single row array of 10 CCUs may be distributed along an edge of the surface of device 410. If desired, multiple row arrays of CCUs may exist within first device 410. As yet another example, a N×M matrix of CCUs may be distributed across the surface of first device 410, where N and M are integers representing the number of CCUs. If desired, second device 410 may also include more than the lone pair of CCUs and they can be arranged in any suitable format as desired.

First device 410 and second device 420 can be characterized as having major and minor surfaces. A major surface has a larger surface than a minor surface. For example, assuming first device 410 is a tablet, laptop, or surface computer, its major surface may embody the relatively larger and flatter portion of the device (e.g., such as a screen or keyboard region, depending on device), whereas its minor surface may embody the relatively small and narrow portion of the device (e.g., such as the edge of a housing). Major surfaces may include surfaces such as the top or bottom of phones, tablets, table surfaces, kiosks, etc. Minor surfaces may be edges of phones, tablets, table surfaces, kiosks, etc. The CCUs may be disposed along one or both of the major and minor surfaces of devices 410 and 420.

Depending on whether the CCUs are disposed along a major or minor surface may change the method by which the connector alignment circuitry guides the user to obtain proper alignment. Since major surfaces may be large enough to contain a CCU anywhere within the confines of the surface, the connector alignment circuitry may have to locate both the X and Y coordinates as well as the angle of that CCU. Whereas, minor surfaces, though smaller than their major surface counterparts, still require location along both X and Y coordinates, precise location of one of the coordinates in may be relaxed relative to the other. The connector alignment circuitry can take knowledge of the devices and their CCU arrangement configurations into account when guiding the user to properly align the connectors.

The CCUs may be used as single and/or multiple paired units. The CCUs may be paired only with certain types of CCUs, may be paired only in specific orientations, or may generally pair with any other CCU. In one embodiment, a single pair of CCUs on a first device may pair with any one of multiple different pairs of CCUs on a second device. For example, if only one pair of CCUs exists on second device 420 but four pairs of CCUs exist on first device 410 (e.g., one pair in each corner), the second device's CCUs can be aligned with any one of the four pairs on first device 410. Regardless of how many potential CCUs the user device can be connected to, the connector alignment circuitry may instruct the user device to connect or pair with any one or more of those CCUs. The connector alignment circuitry may provide alignment cue instructions to connect with the first CCU it senses, or it may provide alignment instruction to connect with a particular set of CCUs.

In another embodiment, the CCUs of both devices may be arranged in a non-linear arrangement that requires a particular orientation to ensure a contactless link is established. As a specific example, the CCUs may be arranged in a U-shaped orientation, such that on a first device CCUs are positioned at the right portion of the U, left portion of the U, and bottom portion of the U. At a second device, CCUs having a similar orientation mirroring the U-shaped configuration so that all three units may be paired and linked when the first and second devices are aligned.

FIGS. 5A-5D show an illustrative scenario where a user manipulates the position of second device 420 with respect to first device 410 in order to establish a contactless link. Second device 420 may provide interactive cues to assist the user in locating and aligning to CCUs of device 410. In one embodiment, the interactive cues may be visual cues that are presented on the display screen on device 420, audio cues that are emitted by device 420, blinking lights cues that are provided by LEDs incorporated into device 420, or any combination thereof. In another embodiment, first device 410 may provide one or more of the same cues as those provided by second device 420.

Figure 5A:
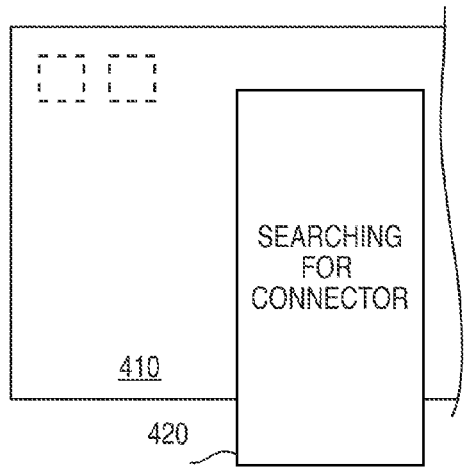
FIGS. 5A-5E show different illustrative connector alignment instructions being presented by a device, according to an embodiment.
Figure 5B:
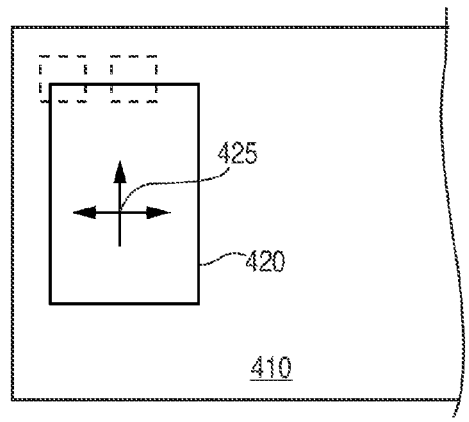
Figure 5C:
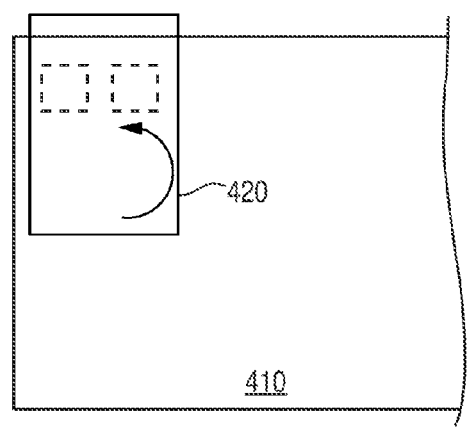
Figure 5D:
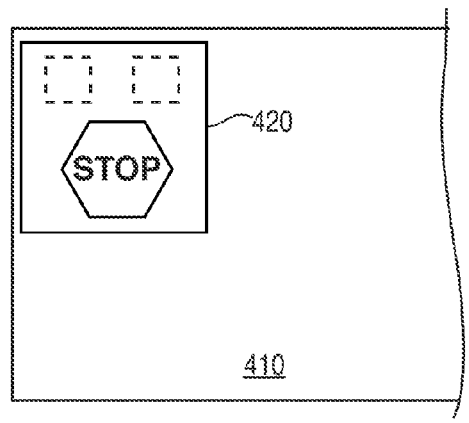

Starting with FIG. 5A, second device 420 may indicate that it is searching for a beaconing signal being emitted by one or both of CCUs 411 and 412. The "searching for signal" indication may be presented as a graphic on a display screen, an audio message, and/or as a display of LED lights (e.g., all lights are blinking a rhythmic fashion). After the signal is detected, second device 420 may instruct the user to move the device in one or more different directions so that it can determine the metes and bounds of the signal(s) being emitted by CCUs (delineated by dashed line boxes). The device may first determine the outer boundary of the signal field emitted by the CCUs, and once it knows that boundary, it can further direct the user to the known location of the CCUs. FIG. 5B shows device 420 providing visual clues on display 425 instructing the user to move the device in orthogonal directions, for example to determine the boundary of the signal field or to direct the user to place the device in a particular location with respect to device 410. FIG. 5C shows another cue instructing the user to rotate the device so that CCUs of device 420 are lined up with respect to the CCUs of device 410. Additional cues, not shown, may be provided to further fine tune the user's positioning of the device 420 with respect to device 410. When device 420 is positioned at or near the optimal position for establishing a contactless link, a cue instructing the user to stop moving the device may be presented, as shown in FIG. 5D. Data communications between devices 410 and 420 may commence after the contactless link is established.

Figure 5E:
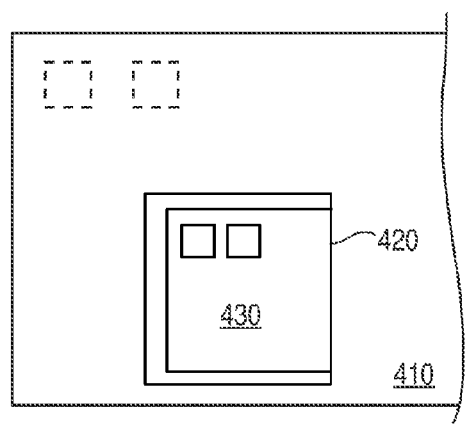

FIG. 5E shows device 420 displaying a visual representation of where the CCUs are located in device 410. In device 410, the CCUs are located in the upper left quadrant. Display 430 can digitally represent the edge boundaries of device 410 and where the CCUs are located relative to those edge boundaries. Display 430 may change as the user positions device 420 closer to the CCUs. For example, when the device far away from the CCUs, display 430 may provide a bird's eye view of device 410, but as the user moves device 420 closer to the CCUs, display 430 may zoom in to provide ever increasing detailed views of device 410.

Figure 6:
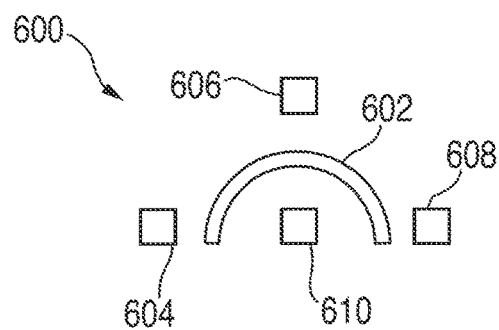
FIG. 6 shows an illustrative light alignment indicator according to an embodiment that may be used to direct a user to a contactless communication unit ("CCU") location.

FIG. 6 shows an illustrative light alignment indicator 600 according to an embodiment that may be used to direct a user to a CCU location. Indicator 600 can include a half circular light element 602 arranged such that the top of the half circle is pointed in the cardinal North direction and the left side of element 602 points in the cardinal West direction and the right side of element 602 points in the cardinal East direction. Indicator 600 can also include directional light elements 604, 606, and 608, located at the Western, Northern, and Eastern points of circular light element 602, respectively. Directional light element 610 can be positioned at a Southern direction location. It should be understood that the cardinal directions are merely illustrative and that there is no requirement that light elements 602, 604, 606, and 608 be positioned as such. Each of light elements 602, 604, 606, 608, and 610 can be independently controlled to provide directional clues as to where the user should move the device, whether a signal has been detected, and whether the device is positioned in the correct location to form a contactless link. The light elements can be turned on and off to provide different movement instructions to direct the user. For example, any one of the directional light elements may be strobed to indicate that the device should be moved in that direction. The strobe speed can be varied to indicate to the user that she should adjust speed of movement. A circular pattern can be created by selectively turning the directional light elements on and off to instruct the user to rotate the device clockwise or counterclockwise. Circular light element 602 may be used to signify whether any signal is detected (e.g., by a relatively slow strobe) and can be used to signify that a contactless connection has been made by emitting a constant non-strobing light.

Figure 7A:
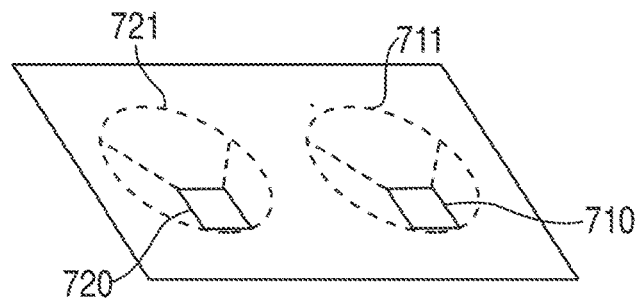
FIGS. 7A and 7B show illustrative RF fields generated by two adjacently placed CCUs, according to an embodiment.
Figure 7B:
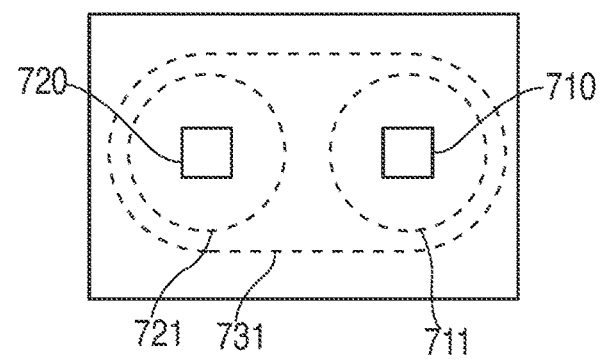

FIGS. 7A and 7B show illustrative RF fields generated by two adjacently placed CCUs, according to an embodiment. FIG. 7A is a perspective view and FIG. 7B is a top view. CCU 710 can emit RF field 711 and CCU 720 can emit RF field 721 when both CCUs are transmitting a beaconing signal or operating as a transmitter. Both CCUs may temporarily operate as transmitters to provide additional RF energy to better enable a user device to detect their presence. Once a connection is made, the CCU initially intended to act as a receiver may revert to receiver operations. Both RF fields 711 and 721 represent a relatively limited range of CCUs 710 and 720. In some embodiments, the CCUs are designed for communicating data over short distances (e.g., on the order of a few centimeters when the dielectric medium is air). RF fields 711 and 721 may also represent the signal space through which signals can be sensed by another device. Each of RF fields 711 and 721 can define respective detection boundaries in which a detector device can ascertain the presence of a contactless connector. For example, RF fields 711 and 721 may define the maximum extent to which each CCU can broadcast signals to alert the presence of CCUs 710 and 720 to another device. In some embodiments, the combination of RF fields 711 and 721 may form a combined RF field 731 that defines a combined detection boundary that can be ascertained by the detector device. The combined RF field 731 may be larger than the sum of RF fields 711 and 721.

It should be understood that although CCUs 710 and 720 may communicate data to other devices that are within their respective RF fields, data transfer rates and signal quality may be optimized when CCUs 710 and 720 are aligned with respective counterpart CCUs. Thus, it is optimal to place EHF communication units relative to each other so that receivers are in line with transmitters' strongest signal paths. Thus, when the user's device detects one or both of RF fields 711 and 721, the CCUs of the user's device may still need to be moved into alignment position with respect to CCUs 710 and 720 in order to achieve optimal performance. Therefore, identifying the boundaries of RF fields 711 and 721, or combined RF field 731 may serve as the first step performed by connector alignment circuitry according to embodiments herein. Thus, in some embodiments, devices that have multiple CCUs, some of which are intended to serve as receivers, may all act as transmitters until desired EHF communication units are paired. Having multiple transceivers act as transmitters may create a larger initial signal range for detection.

The boundaries, as defined by RF fields 711, 721, and 731, may be suitable for alerting the presence of CCUs 710 and 720 to a user device, but mere detection of the boundaries may not be sufficient for establishing a contactless communications link; the detection device may have to be further manipulated in order to establish that connection. Ascertaining the signal boundary, however, provides a starting point for the user device to further guide the user to move the device into the correct orientation. The starting point is provided because the user device, having prior knowledge of the location and orientation of CCU 710 and 720, can specifically direct the user to the correct location and orientation once the signal boundary is ascertained.

The user device may have a database containing location (s) and orientation(s) of CCUs associated with various devices. The user device may ascertain the identity of the device it is attempting to connect to by deciphering information received from the device when it is determining the signal boundary. For example, the information transmitted by CCUs may indicate the device with which they are associated or a particular CCU configuration. If the information is indicative of a particular device, then the user device can look up that device in its database to determine the CCU configuration of that device. If the information is indicative of a particular CCU configuration, then the user device is armed with the knowledge needed to establish a contactless connection. Each CCU may specify which CCU it is (within the CCU configuration) so the user device is provided with additional information to assist it in determining how to instruct the user to orient the device to establish a connection.

After a signal boundary is located, the user device may instruct the user to move the device so that it can determine a periphery of the signal boundary (e.g., the periphery of combined RF field 731). Once the periphery of the signal boundary is determined, the user device is made aware of the space it should navigate within in order to establish a connection. That is, with knowledge of the periphery of the signal boundary and the CCU configuration, the user device can determine where the CCUs are located relative to the signal boundary periphery and thus knows exactly where it needs to be positioned to establish the connection. For example, the user device may initially position itself in a corner of the peripheral signal boundary as a starting point and instruct the user to move a fixed distance (e.g., in two dimensions) from the starting point to establish the connection.

Figure 8:
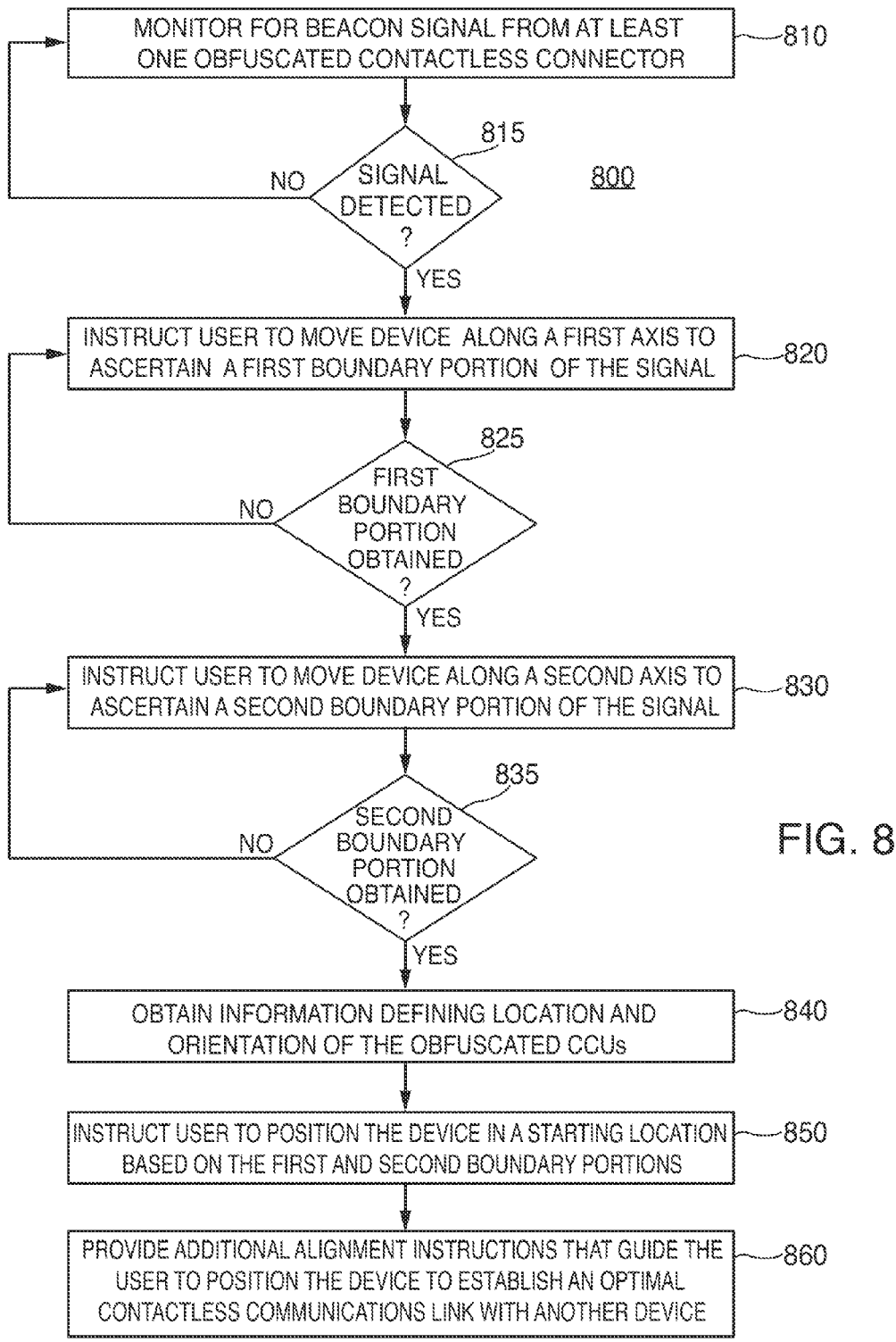
FIG. 8 shows an illustrative process for establishing a connection between a first device and second device having obfuscated CCUs, according to an embodiment.

FIG. 8 shows an illustrative process 800 for establishing a connection between a first device and second device having obfuscated CCUs, according to an embodiment. The first device may be a user device that is attempting to establish a contactless connection with the second device. The second device may periodically transmit beacon signals to alert its presence to any device that may be attempting to connect to it. The beacon signals may include identifying information that can assist the first device in establishing a contactless connection. In addition, the beacon signals emitted by each CCU can define a signal boundary and the combination of the CCUs can form a combined signal boundary. Each signal boundary and combined signal boundary may define a signal boundary periphery that can be detected by the first device. Process 800 may be performed by the first device.

At step 810, the first device may monitor for a beacon signal being emitted by at least one obfuscated contactless connector. If a signal is detected at step 815, process 800 proceeds to step 820. If no signal is detected, process 800 reverts to step 810. At step 820, the first device may instruct the user to move the device along a first axis to ascertain a first portion of a signal boundary. For example, if the user moves the device left and right along an X-axis, the left and right edges of the signal boundary may be ascertained.

Process 800 may continue to instruct the user to move the first device until the first portion is obtained, the determination of which is performed at step 825. After the first boundary portion is obtained, process 800 may proceed to step 830. At step 830, the user may be instructed to move the first device along a second axis to ascertain a second boundary portion of the signal. For example, the user may be instructed to move the device along the Y-axis so that the top and bottom edges of the signal boundary can be determined. Process 800 may continue to instruct the user to move the first device until the second boundary portion is obtained, the determination of which is performed at step 835. After the second direction boundaries are obtained, process 800 may proceed to step 840.

At step 840, the first device may obtain information defining the location and orientation of the obfuscated CCUs. For example, the information may be transmitted to the first device when it is being moved around to ascertain the first and second direction boundaries.

At step 850, the first device may instruct the user to position the device in a "starting point" location based on the ascertained first and second boundary portions. For example, the staring point may be a particular corner of the signal boundary or the center of the signal boundary. The starting point, coupled with knowledge of the location and orientation of the at least one obfuscated contactless connector, enables the first device to provide additional instructions that guide the user to position the first device with respect to the second device so that a contactless communications link can be established.

At step 860, the first device can provide the additional instructions that guide the user to position the device so that an optimal contactless communications link can be established. For example, the user may be presented with on-screen display instructions, audio instructions, light indicating instruction, haptic instructions, or any combination thereof to properly align the contactless connectors in both devices. The instructions can inform the user to move the device in directions such as to the left, right, up, down, and/or diagonal, to cease moving, and to rotate the device, all with respect to the second device.

It should be appreciated that the steps presented herein may be modified, executed in a different order, or omitted, and that additional steps may be added. For example, step 850 can be satisfied the moment the first and second boundary portions are determined and the instant location of the first device at the time of that determination may serve as the known point of reference. As another example, the peripheral boundary can be located along one or more different axes.

It should be appreciated that alignment guidance may be presented using many different techniques, including those discussed above in connection with FIGS. 5A-5D. Visual and haptic feedback may be used to assist users in aligning EHF communication units. Visual feedback may include using GUIs such as bulls eyes, bubbles, lines, arrows, trackfinders, etc. to show users which direction they should move devices relative to each other. In an example where devices may be paired along their major surfaces, and assuming the beaconing signal has a fixed diameter, a display may show a bubble that matches the diameter of a detected beaconing signal. If signal is detected on the left side of a device, a portion of a bubble may begin to appear on the left side of the display. As the user moves the device to the left, more of the bubble may begin to appear on the display. When the devices are positioned so that the CCUs are in proper alignment, the full bubble may appear centered on the display. In some embodiments, an additional indicator such as an audio beep or flashing circles may indicate to users that the communication units are in proper alignment. In some embodiments, indicators may also be used when data transfer is complete.

In one specific example, a first device can include a GUI, and a second device may or may not include a GUI. The first device may be the device being moved relative to the second device, and the GUI on the first device can provide guidance cues (e.g., bulls eyes, bubbles, lines, arrows, trackfinders, etc.) to assist the user in positioning the first device with respect to the second device.

In other specific example, a first device can be a laptop computer or tablet and the second device may or may not include a GUI. The first device may remain stationary but presents guidance cues on its GUI to indicate where the second device should be placed. For example, in a laptop, the contactless interface may be located under the trackpad, and the GUI of the laptop may provide guidance cues on positioning the second device in the correct position on top of the trackpad. As the user positions the second device over the trackpad, the GUI can provide alignment cues.

In yet another specific example, both first and second devices can be phones each having their own GUI. The GUI on one or both phones may provide guidance cues so that the contactless interfaces of both devices are properly aligned.

In an embodiment where devices transfer data along their minor surfaces, a GUI may use lines to indicate whether the devices are aligned along a first axis. For example, a first device may be a laptop and the second device may be a mobile phone. Data may be transferred via the left side of the first device and the right side of the second device, or vice versa. In this example, a user may align the left edge of the first device with the right edge of the first device. Since the communication units are already at the edge of the devices, there is high probability that they are aligned along a second axis. Thus, the user merely has to move the second device along the first axis to align the communication units.

In another embodiment, a GUI may show a directional line flanked by two separate device lines that are each orthogonal to the directional line. One of the device lines may indicates the relative position of a communication unit in a first device and the other device line may indicate the relative position of a communication unit on a second device. The directional line may rotate to indicate the direction the user should move the first device relative to the second device. As the user aligns the communication units of the two devices closer together, the two device lines may eventually merge into one single line, thereby indicating that optimal alignment has been achieved. If the user moves the device in the wrong direction, the gap separation between the two device lines may become larger. Similarly, arrows may be used to assist users in aligning EHF communication units. A display may indicate to the user which direction devices should be moved relative to each other to properly align EHF communication units.

In yet another embodiment, lights may indicate where the communication units are positioned relative to each other. For example, the lights may be in a U-shaped orientation, with perfect alignment when all three lights are lit. The number of lights lit may indicate to users how they should orient the devices relative to each other to achieve proper alignment of the EHF communication units. For example, when only one on the right is lit, it signals to the user to turn or move the device to the right and when only one on the left is lit, it signals users to turn or move the device to the left.

In other embodiments, haptic feedback is used. Haptic feedback can include many different feedback cues that the user can feel or hear. The feedback cues can vary in number or frequency of duration, and the feedback may change depending on where the user has placed his device relative to the other device. For example, one long feedback may mean that the EHF communications are in proper alignment. Low frequency of short feedbacks may indicate that the devices are within signal range, but not quite properly aligned. When the units are closer to proper alignment, the frequency of feedbacks may increase until they are properly aligned and one long feedback will occur.

Different parts of a device can provide haptic feedback, such that different parts of the device providing feedback may indicate how the user should orient the devices relative to each other. For example, if the device should be moved or turned to the right, the right side of the device may send short bursts of vibrations until properly aligned.

Different approaches may be exercised to determine when two devices should begin connector alignment. In one approach, the transmitter of one device may periodically transmit a beacon signal. When the other device senses that beacon signal and sends a response, both devices may initiate connection alignment. In another approach, one or more different sensors located in a first device may be used to sense the presence of the second device. For example, a user may press a switch on the first device to initiate connection alignment.

In another example, the first device may include one or more of a proximity sensor, heat sensor, pressure sensor, capacitive sensor to detect the presence of the second device. Thus, when the second device is placed on or near the first device, one or more of the sensors may detect the presence of the second device and initiate connection alignment. One or more of these sensors may exist as a component that is germane to the device to which it is associated. For example, the touch pad of a laptop or touchscreen of a device may serve as the sensor for detecting the presence a second device placed thereon. In some touch pad embodiments, a GUI may be presented on a screen (e.g., the display of the computer associated with the touch pad) to guide the second device to the optimal connection alignment on the touch pad. In some touchscreen embodiments, a GUI may be displayed on the touchscreen itself to guide the second device to the correct location on the touchscreen. In other embodiments, when the second device is detected, the touch pad or touch screen can be disabled so that connector alignment can commence on the second device.

In other embodiments, wave phases may assist users in finding proper alignment when there are multiple communication units. For example, depending on antenna design, an EHF communication unit may radiate contactless signals within a certain phase range. A first EHF communication unit may be configured so that signals are only radiated in a first phase, so that in order for a second EHF communication unit to pair with it, the second communication unit must be placed in the first phase. In these embodiments, the wave phases may be used to indicate to users which way to turn devices relative to each other so that the multiple communication units are aligned. For example, the wave phase configuration may limit the second device so that it will only detect signals when it is within the configured phase area. This configuration necessarily limits how the devices may be oriented relative to each other as compared to when a full signal radius is available. Such limitations in conjunction with above described GUIs may be utilized to assist users in properly aligning multiple communication units. For example, there may be four pairs of communication units that need to be aligned—A, B, C, D that form a rectangle on a first device. Assuming corner A is the upper left hand corner of a rectangle. A wave phase configuration may make it so when the user rotates a second device to the right, towards communication units B, C and D, signal indicators show the user that they are moving the devices in the correct direction. When the user moves the second device towards the left, relative to the first device, the signal indicators may show the user that they are moving the second device out of the signal range of the first device.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-8, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A base device operative to contactlessly communicate with a user device, the base device comprising:
    a housing characterized as having a major surface and a minor surface, wherein the minor surface is substantially perpendicular to the major surface;
    at least one obfuscated contactless communication transceiver unit (OCCTU) disposed along one of the major surface and the minor surface, the at least one OCCTU operative to:
        emit a beaconing signal that alerts presence of a RF field to the user device and that includes identifying information specifying whether the base device has its at least one OCCTU disposed along its major surface or minor surface such that when the user device receives the beaconing signal, the user device provides alignment instructions for the user to position the user device with respect to the base device such that at least one CCTU associated with the user device is optimally aligned with the at least one OCCTU disposed along the major surface or the minor surface of the base device; and
        establish a contactless link with a contactless communication unit (CCU) associated with the user device when the user device is positioned in a connection alignment position with respect to the base device, wherein the CCTU and the OCCTU contactlessly communicate with each other in an approximate 60 GHz frequency domain; and
    an I/O component that provides alignment instructions that guide a user to position the user device with respect to the base device.

2. The base device of claim 1, further comprising a touchpad arranged on the major surface, wherein the at least one OCCU is located adjacent to the touchpad.

3. A base device operative to contactlessly communicate with a user device, the base device comprising:
    a housing characterized as having a major surface and a minor surface, wherein the minor surface is substantially perpendicular to the major surface;
    at least one obfuscated contactless communication transceiver unit (OCCTU) disposed along one of the major surface and the minor surface, the at least one OCCTU operative to:
        emit a beaconing signal that alerts presence of a RF field to the user device and that includes identifying information specifying whether the base device has its at least one OCCTU disposed along its major surface or minor surface such that when the user device receives the beaconing signal, the user device provides alignment instructions for the user to position the user device with respect to the base device such that at least one CCTU associated with the user device is optimally aligned with the at least one OCCTU disposed along the major surface or the minor surface of the base device; and
        establish a contactless link with a contactless communication unit (CCU) associated with the user device when the user device is positioned in a connection alignment position with respect to the base device, wherein the CCTU and the OCCTU contactlessly communicate with each other in an approximate 60 GHz frequency domain; and
    a sensor that detects whether the user device is placed adjacent to the base device, whereupon detection, the beaconing signal is transmitted.

4. A base device operative to contactlessly communicate with a user device, the base device comprising:
    a housing characterized as having a major surface and a minor surface, wherein the minor surface is substantially perpendicular to the major surface; and
    at least one obfuscated contactless communication transceiver unit (OCCTU) disposed along one of the major surface and the minor surface, the at least one OCCTU operative to:
        emit a beaconing signal that alerts presence of a RF field to the user device and that includes identifying information specifying whether the base device has its at least one OCCTU disposed along its major surface or minor surface such that when the user device receives the beaconing signal, the user device provides alignment instructions for the user to position the user device with respect to the base device such that at least one CCTU associated with the user device is optimally aligned with the at least one OCCTU disposed along the major surface or the minor surface of the base device; and establish a contactless link with a contactless communication unit (CCU) associated with the user device when the user device is positioned in a connection alignment position with respect to the base device, wherein the CCTU and the OCCTU contactlessly communicate with each other in an approximate 60 GHz frequency domain, wherein the user device provides alignment guidance instructions based on the RF field and the identifying information.

* * * * *

UNITED STATES PATENT AND TRADEMARK OFFICE
CERTIFICATE OF CORRECTION

PATENT NO. : 10,405,316 B2  
APPLICATION NO. : 14/886354  
DATED : September 3, 2019  
INVENTOR(S) : Kersjes et al.

Page 1 of 1

It is certified that error appears in the above-identified patent and that said Letters Patent is hereby corrected as shown below:

In the Specification

In Column 11, Line 2, delete "Elf" and insert -- EHF --, therefor.

In Column 19, Line 60, delete "staring" and insert -- starting --, therefor.

In the Claims

In Column 24, Claim 4, Line 55, delete "surface; and" and insert -- surface; --, therefor.

Signed and Sealed this  
Fifth Day of May, 2020

Andrei Iancu  
*Director of the United States Patent and Trademark Office*